United States Patent
Dickinson

(10) Patent No.: US 7,604,566 B2
(45) Date of Patent: Oct. 20, 2009

(54) SYSTEM AND METHOD OF CONTROLLING A TORQUE CONVERTER LOCKUP CLUTCH

(75) Inventor: Michael T. Dickinson, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 396 days.

(21) Appl. No.: 11/681,337

(22) Filed: Mar. 2, 2007

(65) Prior Publication Data

US 2008/0214354 A1 Sep. 4, 2008

(51) Int. Cl.
*F16H 61/68* (2006.01)
*F16D 33/00* (2006.01)

(52) U.S. Cl. ........................ 477/65; 192/3.31

(58) Field of Classification Search .............. 477/64, 477/65; 192/3.3, 3.31, 103 F; 701/53
See application file for complete search history.

(56) References Cited

U.S. PATENT DOCUMENTS

| | | | |
|---|---|---|---|
| 5,010,990 | A | 4/1991 | Yoshimura et al. |
| 5,573,473 | A * | 11/1996 | Asayama et al. ............ 477/63 |
| 5,609,552 | A | 3/1997 | Furuya et al. |
| 5,752,895 | A | 5/1998 | Sugiyama et al. |
| 5,754,969 | A | 5/1998 | Ando et al. |
| 5,802,490 | A | 9/1998 | Droste |
| 5,893,438 | A | 4/1999 | Hasegawa et al. |
| 6,077,188 | A * | 6/2000 | Futamura et al. ............ 477/65 |
| 6,253,140 | B1 | 6/2001 | Jain et al. |
| 6,314,357 | B1 | 11/2001 | Kon et al. |
| 6,341,679 | B1 | 1/2002 | Abe et al. |
| 6,385,520 | B1 | 5/2002 | Jain et al. |
| 6,508,740 | B2 | 1/2003 | Kimura et al. |
| 6,928,357 | B2 | 8/2005 | Higashimata et al. |
| 7,073,647 | B2 | 7/2006 | Morise et al. |
| 7,437,965 | B2 * | 10/2008 | Shizume ..................... 74/333 |

* cited by examiner

*Primary Examiner*—Dirk Wright
(74) *Attorney, Agent, or Firm*—Mark E. Duell; Rankin, Hill & Clark LLP

(57) ABSTRACT

A torque converter lockup clutch control system is provided for an associated automatic transmission. The system includes a torque converter having an impeller operatively coupled to an associated internal combustion engine and a turbine operatively coupled to an input shaft of the associated automatic transmission. A lockup clutch is disposed within the torque converter for selectively locking the impeller to the turbine. A pressure regulator is operatively coupled to the torque converter for adjusting the pressure of a working fluid to at least one shift clutch of the associated automatic transmission in response to a speed differential between the impeller and turbine of the torque converter. A shift clutch slip detector is provided for detecting a slip condition of the at least one shift clutch of the associated automatic transmission and outputs a slip value. A processing component is then provided for receiving the slip signal and prohibiting the lockup clutch from entering into an engaged state when the slip value exceeds a predetermined shift clutch slip threshold.

22 Claims, 5 Drawing Sheets

SYSTEM AND METHOD OF CONTROLLING A TORQUE CONVERTER LOCKUP CLUTCH

BACKGROUND

The present disclosure generally relates to a control strategy for a vehicle torque converter for an automatic transmission. More particularly, the torque converter is controlled in such a manner as to reduce or eliminate slip in the individual speed or shift clutches of the automatic transmission.

Conventional automatic transmissions rely on a torque converter for the primary purpose of transforming a high revolutions-per-minute (rpm) and low torque operating state of an internal combustion engine to a lower rpm and higher torque state. A prime example includes when the vehicle is at a stop, in a drive gear, and at or near idle. In this case, the torque converter transforms, via a hydraulic or viscous coupling, the idle speed of the engine (typically 300-900 rpm) to a speed of 0-100 rpm. At the same time, the speed reduction is accompanied by an increase in torque. This is beneficial since a large amount of starting torque is required to accelerate the vehicle from a stationary position. Conversely, when the vehicle is traveling at a higher rate of speed, the torque converter is no longer needed and to improve efficiency a lockup clutch is provided to directly couple the engine to the transmission.

In addition, the conventional automatic transmission uses a plurality of shift clutches to switch among various gear trains, each having a specific gear ratio or speed range. Under high load conditions a great deal of torque must be transmitted through the shift clutches. If the torque exceeds the design value for the clutches or if the clutches have become worn, shift clutch slip can occur that will lead to rapid wear-out of the shift clutch and or other related components.

To reduce or eliminate this possibility, other systems have been designed to monitor clutch slip and to increase the pressure to the slipping clutch. However, these systems are often complicated, require additional components and/or separate delivery systems. Other systems use a torque converter reaction torque to develop the necessary pressure to reduce shift clutch slip. However, these systems do not provide the necessary reaction torque when the torque converter lockup clutch is in the engaged state. Moreover, these systems do not restrict torque converter lockup in the event of a slipping shift clutch.

For these reasons, an improved torque converter lockup control system and strategy is needed to aid in reducing or eliminating shift clutch slip in an automatic transmission.

SUMMARY

According to one aspect, a torque converter lockup clutch system is provided for an associated automatic transmission. More particularly, in accordance with this aspect, the system includes a torque converter having an impeller operatively coupled to an associated internal combustion engine and a turbine operatively coupled to an input shaft of the associated automatic transmission. A lockup clutch is disposed within the torque converter for selectively locking the impeller to the turbine. The lockup clutch includes an engaged state and a disengaged state. A pressure regulator is operatively coupled to the torque converter for adjusting the pressure of a working fluid to at least one shift clutch of the associated automatic transmission in response to a speed differential between the impeller and turbine of the torque converter. A shift clutch slip detector is provided for detecting a slip condition of the at least one shift clutch of the associated automatic transmission and outputs a slip value. A processing component is provided for receiving the slip signal and prohibiting the lockup clutch from entering into the engaged state when the slip value exceeds a predetermined shift clutch slip threshold.

According to another aspect, a method for controlling a torque converter lockup clutch is provided for eliminating or reducing shift clutch slip in an automatic transmission. More particularly, in accordance with this aspect, the method includes determining if at least one shift clutch of the automatic transmission is slipping and outputting a corresponding slip value. The method also includes disengaging the torque converter lockup clutch if the lockup clutch is in an engaged state and the slip value exceeds a permitted shift clutch slip threshold. In addition, the method includes increasing a differential speed between an input portion and an output portion of the torque converter. Furthermore, the method includes generating a boost in hydraulic shift clutch pressure, via the increase in differential speed within the torque converter, for reducing slip in the at least one shift clutch.

According to yet another aspect, a torque converter lockup clutch system for an associated automatic transmission is provided. The system includes a torque converter including an impeller operatively coupled to an associated internal combustion engine, a turbine operatively coupled to an input shaft of the associated automatic transmission, and a stator disposed in a working fluid pathway between the impeller and the turbine. A lockup clutch is disposed within the torque converter for selectively locking the impeller to the turbine, the lockup clutch having an engaged state and a disengaged state. A reaction arm is attached to the stator of the torque converter for transmitting a reaction torque developed by the working fluid of the torque converter. A pressure regulator is operatively coupled to the reaction arm for adjusting the pressure of the working fluid to at least one shift clutch of the associated automatic transmission. A shift clutch slip detector is provided for detecting a slip condition of the at least one shift clutch, the slip detector outputting a slip signal. An engine control unit (ECU) is provided for receiving the slip signal and prohibiting the lockup clutch from entering into the engaged state, when the slip signal exceeds a predetermined shift clutch slip threshold.

DETAILED DESCRIPTION

Figure 1:
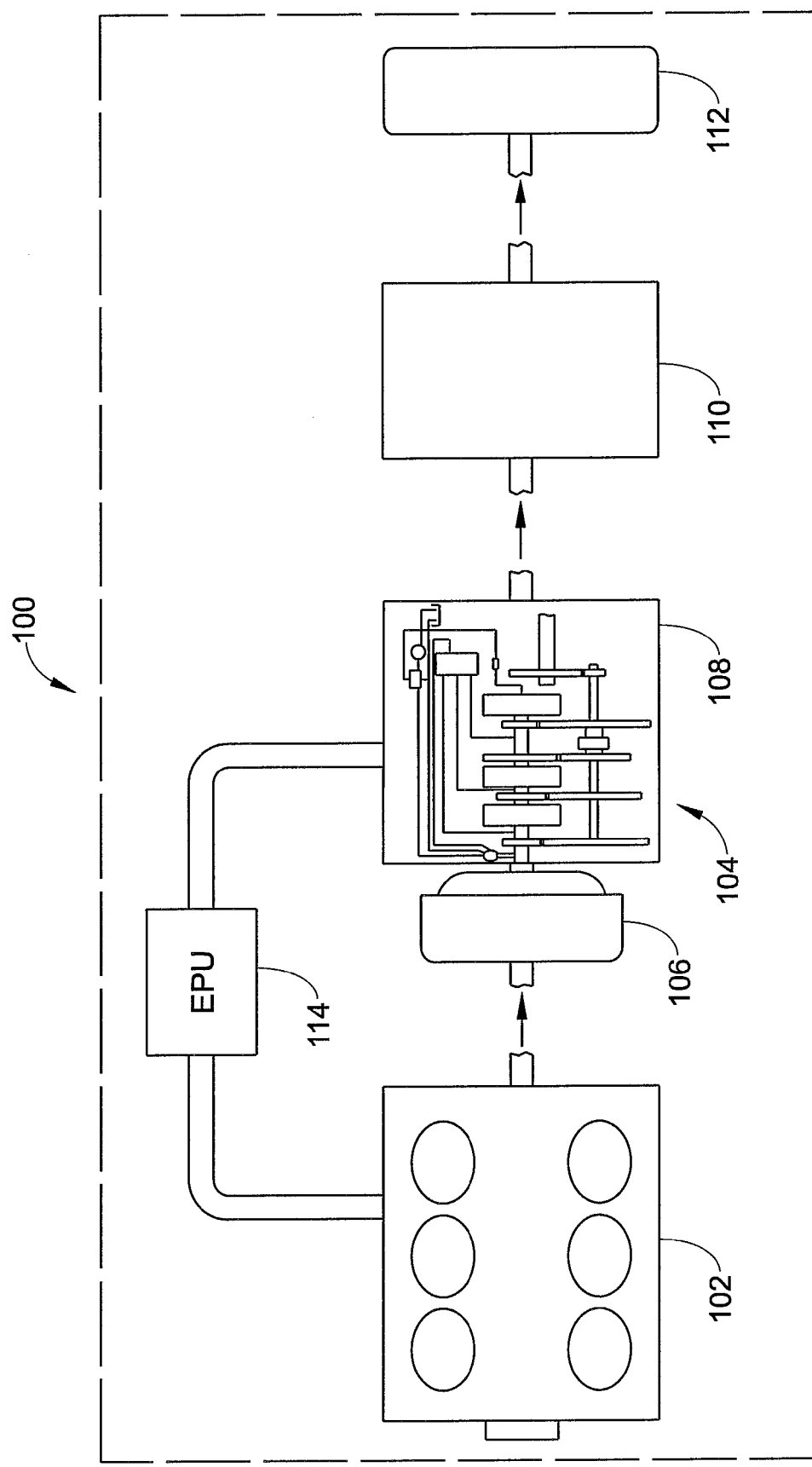
FIG. 1 is a schematic view of an engine and driveline, including a torque converter and automatic transmission, for a vehicle having an improved torque converter lockup clutch system.

Referring now to the drawings wherein the showings are for purposes of illustrating one or more exemplary embodiments, FIG. 1 is a schematic view of a torque converter lockup clutch system 100 for a vehicle. Generally, the system 100 includes an internal combustion engine (ICE) 102 that is coupled to an automatic transmission 104 having a torque converter 106 and a gearbox 108. The transmission 104 is then coupled to a driveline, differential, or series of shafts 110 which are then eventually coupled to one or more wheels 112 of a vehicle. In addition, an electronic processing unit (EPU) 114 is also used to monitor various parameters and to execute certain operations based on the operating conditions of the vehicle. As is known and understood by those skilled in the art, the EPU 114 can be a stand alone processing unit or may be combined with some other processing unit of the vehicle, such as an electronic control unit (ECU) of the engine 102, for example.

Figure 2:
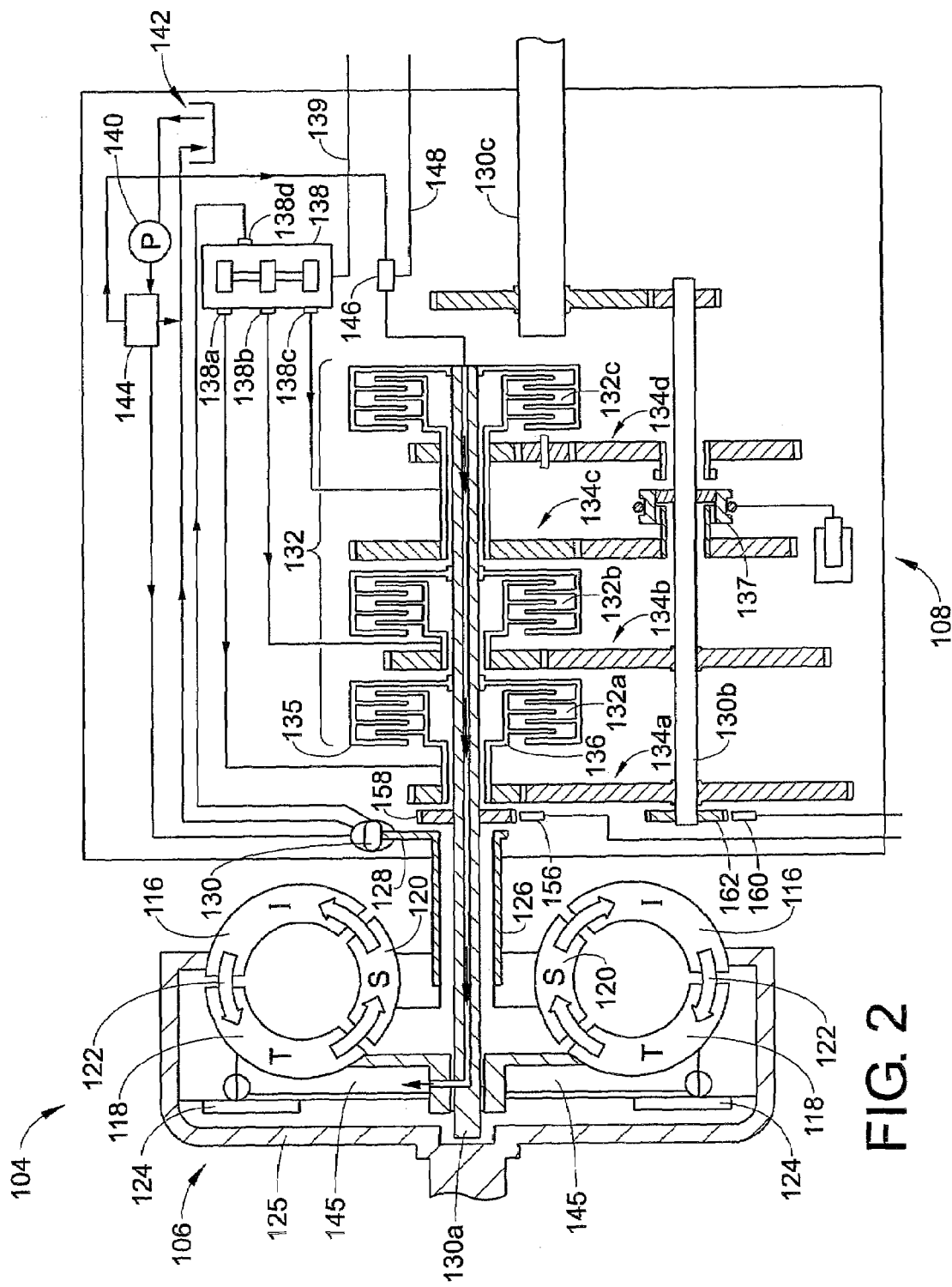
FIG. 2 is an enlarged, more detailed schematic view of the torque converter and automatic transmission of the improved torque converter lockup clutch system of FIG. 1.

With reference to FIG. 2, an enlarged, more detailed schematic view of the torque converter 106 and gearbox 108 of the automatic transmission 104 is shown. The torque converter 106 includes an impeller 116 which is directly coupled to and driven by the engine. As shown in FIG. 2, the impeller 116 also forms a portion of the outer housing of the torque converter 106. The torque converter 106 further includes a turbine 118 that is typically fixed to an input shaft 130a of the gearbox 108. The turbine 118 and the impeller 116 are hydraulically coupled via a working fluid, such as hydraulic grade oil. In addition, a stator 120 is disposed within a fluid flow pathway 122 of the working fluid between the impeller 116 and the turbine 118. During operation, the fluid flow pathway 122 within the torque converter 106 resembles that of a toroid. Hydraulic fluid is drawn into the impeller 116 from the stator 120 where the fluid is accelerated and urged into the turbine 118. In response, the turbine produces a torque which is then transferred to the input shaft 130a. Due to this hydraulic coupling, the engine 102 is able to transmit substantial amounts of energy from an output or driveplate of the engine to the input 130a of the gearbox 108.

With continued reference to FIG. 2, under certain circumstances it is preferable to directly or mechanically couple (as opposed to hydraulically couple) the output of the engine to the input of the gearbox 108 in order to improve efficiency and avoid fluid flow energy losses. This is accomplished through the use of a lockup clutch 124 that may be provided within the torque converter 106. The lockup clutch 124 can be secured to the same housing or hub to which the turbine 118 is connected. Typically, the lockup clutch 124 includes an engaged state and a disengaged state. As shown in FIG. 2, the lockup clutch 124 is in the disengaged state and the turbine 118 is able to rotate somewhat independently of the impeller 116. When the lockup clutch 124 is in the engaged state, a clutch surface of the lockup clutch 124 contacts an engaging portion 125 that is rigidly attached to or forms part of the impeller 116. As such, the turbine and the impeller can rotate as an integrated unit. To move the lockup clutch 124 between the disengaged state and the engaged state, one or more of a hydraulic pressure, a biasing element, or an electromagnetic means may be used as is known and understood by those skilled in the art.

Figure 3:
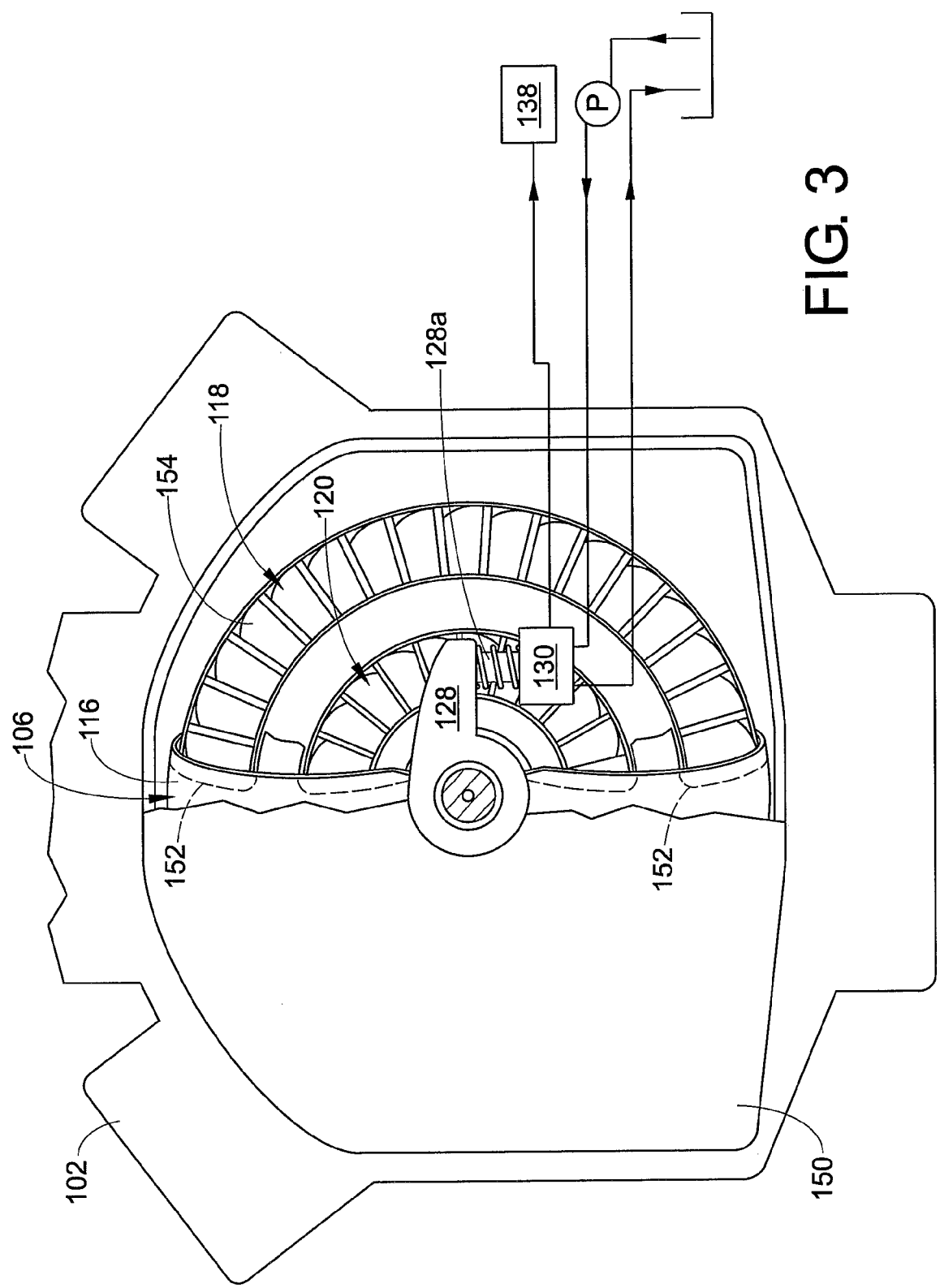
FIG. 3 is an end elevational view, partially in cross section, of the torque converter and the automatic transmission showing an interface between a stator reaction arm of the torque converter and a pressure regulator of the automatic transmission.

During operation, the impeller 116 is operating or rotating at the same speed as the engine, whereas the turbine 118 is operating at a speed consistent with a multiple of the wheel speed of the vehicle. When the differential speed between the impeller and turbine is great, a working fluid slip factor of the torque converter is high which results in a large reaction torque being developed by the turbine and the stator. However, when the differential speed between the impeller and turbine is low, the fluid slip factor is low and the reaction torque being generated by the turbine and the stator fluid flow is also low. With reference to FIGS. 2 and 3, the reaction torque produced from the impinging fluid flow on the stator 120 is transmitted via an annular stator shaft 126, into the gearbox 108, to a stator reaction arm 128. The stator reaction arm 128 is then coupled to a pressure regulator 130 which adjusts the hydraulic pressure supplied to a plurality of shift clutches 132 relative to the reaction torque produced by the stator 120.

With continued reference to FIG. 2, each shift clutch 132 is associated with a certain speed or gear ratio for the transmission 104. For example, a first speed clutch 132a may selectively couple (via a first speed gear train 134a) the input shaft 130a to an intermediate shaft 130b thereby transmitting power to an output shaft 130c of the gearbox 108 or transmission 104. As is commonly known and understood, the first or starting speed ratio of the transmission 104 (i.e. first gear or low) provides the greatest amount of torque to the drive line of the vehicle. Similarly, a second shift clutch 132b mechanically couples the input 130a of the gearbox 108 to the output 130c of the gearbox 108 via a second gear train 134b having a lower gear ratio than the first gear train 134a (otherwise known as second gear). Furthermore, a third speed shift clutch 132c may be provided for mechanically coupling the input 130a to the output 130c in both a forward direction and a reverse direction. In the forward direction, a third speed gear train 134c (having a lower gear ratio than the second gear train 134b) is used, whereas in the reverse direction, a reverse gear train 134d (having a reversing idler gear and a gear ratio similar to that of the first gear train 134a) is used. In order to select between the forward and the reverse directions, a slideably engaged coupler 137 may be used to selectively engage the third speed gear train 134c or the reverse gear train 134d to the intermediate output shaft 130b. The coupler 137 may be urged between the third speed and the reverse positions via a mechanical linkage, electrical solenoid, and or a hydraulic piston as is known and understood by those skilled in the art. Though the illustrated transmission 104 is shown as a three-speed transmission with reverse, it is to be understood and appreciated by those skilled in the art that the transmission 104 could have fewer or more gears and need not be configured exactly as shown.

In addition, each of the plurality of shift clutches 132 includes a set of driving plates 135 and a set of driven plates 136. The driving plates 135 serve as the input to the shift clutch and are secured to the input shaft 130a of the gearbox. Conversely, the driven plates 136 each serve as the output of the corresponding shift clutch and is secured to an output shaft or hub that only rotates when the driving plate engages or clamps onto the corresponding driven plate. The driving plates 135 and driven plates 136 will engage when supplied with adequate hydraulic fluid pressure as will be described in more detail below. Generally, the overall torque transfer ability of the clutch is limited by (1) the physical properties of the components and materials (e.g., yield strength, tensile strength, coefficient of friction, etc.) (2) the geometry of the clutch (size and or number of plates) and (3) the clamping force developed between the plates as a result of the actuating hydraulic fluid pressure.

With continued reference to FIG. 2, the shift clutches 132 may be individually actuated by a shift valve 138. The shift valve 138 may be a hydraulic spool valve or other solenoid valve capable of diverting a source of pressurized hydraulic fluid to the appropriate shift clutch. As shown in FIG. 2, the shift valve 138 includes a first output port 138a, a second output port 138b, a third output port 138c, and an input port 138d. Each of the input ports 138a, 138b, 138c is connected to its respective shift clutch 132a, 132b, 132c via a series of hydraulic channels or tubing. A shift valve control line 139 is also provided that electromechanically and or hydraulically controls the shift valve 138 and the respective engagement of the shift clutches 132. In addition, a hydraulic pump 140 generates a source of pressurized hydraulic fluid for the system. The pump 140 draws fluid from a reservoir 142 and delivers it to one or more system regulators 144 where various system pressures are set for the automatic transmission 104. For example, the system regulator 144 may set the input pressure for the shift clutch pressure regulator 130 along the order of 200 psi (13.8 bar). In addition, the system regulator 144 may set the control pressure for the shift valve 138 or other clutch control devices (e.g, linear solenoids, spool valves, torque converter lockup solenoid, etc.) along the order of 85 psi (5.86 bar). The shift clutch pressure regulator 130 may then further reduce the input pressure provided by the system regulator 144 to a nominal shift clutch pressure on the order of 150 psi (10.3 bar). During periods of high torque transfer the output (or boost) pressure of the shift clutch regulator may even exceed 200 psi (13.8 bar). The output of the shift clutch pressure regulator 130 is then delivered to the shift clutches 132 via the shift clutch valve 138.

Similar to the engagement of the shift clutches 132, the lockup clutch 124 of the torque converter 106 may also be hydraulically actuated using the system pressure generated by the pump 140 and regulated by the system regulator 144. The hydraulic fluid pressure necessary to engage the lockup clutch 124 may be delivered by a through bore along the input shaft 130*a* to a lockup clutch cavity 145. To control the flow of the hydraulic or working fluid, a torque converter lockup clutch (TCLC) valve 146 is connected to the system pressure and may be hydraulically or electronically actuated via a control line 148. By way of example, the control signal used to actuate the TCLC valve 146 may consist of a 5 v or 12 v DC signal. The DC signal is then used to energize a solenoid within the valve 146 to allow hydraulic fluid to travel into the input shaft 130*a* and into the torque converter 106. The TCLC valve 146 may also be configured to prohibit fluid flow into the torque converter lockup clutch cavity when the control signal is at DC ground or 0 volts. When deactivated, the TCLC valve 146 would thus allow the pressure within the cavity to bleed down causing the lockup clutch 124 to disengage. It should be noted that the TCLC could operate in a variety of manners. For example, rather than using hydraulic fluid pressure to maintain the TCLC in the engaged state, the hydraulic fluid pressure could be used to maintain the TCLC in the disengaged state.

Now with reference to FIG. 3, a rear view of the torque converter 106 and engine 102 are shown in broken view through a vertical cross section of a front wall of the transmission housing 150. As illustrated, a series of impeller blades 152 (shown in dashed lines) can be formed as part of the housing of the torque converter 106. Also, a series of turbine blades 154 are shown disposed about the turbine 118. As discussed previously, the stator 120 may be disposed between the impeller 116 and the turbine 118 for redirecting the flow into the impeller 116. The reaction torque developed in the stator as a result of the impinging fluid flow (which is greater during periods of high fluid slip) is eventually transmitted to the stator arm 128. The stator arm 128 contacts or is otherwise coupled to an adjusting member 128*a* of the shift clutch pressure regulator 130. By way of example, the adjusting member can be a small diameter piston that includes a throttling portion. By displacing the piston or adjusting member 128*a*, the regulator 130 increases or decreases the pressure to the clutch shift valve 138. Thus, during periods of high fluid slip in the torque converter (and when high levels of torque are being transmitted to the shift clutches via the input shaft), the shift clutch pressure is also increased to prevent shift clutch slip.

With reference once again to FIG. 2, the gearbox 108 of the automatic transmission 104 may be outfitted with one or more sensors for determining an input speed and an output speed of the shift clutches 132. For example, a first speed sensor 156 may be mounted proximal to the input shaft 130*a* of the gear box 108 for determining the input speed to the shift clutches 132. A gear or other notched hub 158 may be provided allowing the sensor 156 to detect the individual notches of the hub 158 as they rotate past the sensor 156 to produce an electric pulse train. Knowing the spacing between the notches and maintaining a count of the notches over a given time can produce a reliable and accurate method of determining the speed of a shaft. Thus, a speed can be calculated for the driving plates 135 of the shift clutches 132. Similarly, a second speed sensor 160 may be mounted proximal to an output shaft, such as the intermediate shaft 130*b* or the output shaft 130*c*. As shown in FIG. 2, the second speed sensor 160 is mounted proximal to a notched hub 162 for providing a pulse train corresponding to the rotational speed of the intermediate output shaft 130*c*. Knowing the gear ratios for each of the gear trains, the rotational speed of each driven plate 136 can be calculated based on the rotational speed of the intermediate or output shafts 130*b*, 130*c*. Of course, a multitude of other techniques may be used to acquire or monitor the differential speed across the shift clutches. For example a magnetic pickup or interference device such as a Hall effect sensor may be used for producing the pulse train. Also, one or more inductive generating means may be used to provide an analog signal corresponding to the respective speeds of the input and output shafts.

Figure 4:
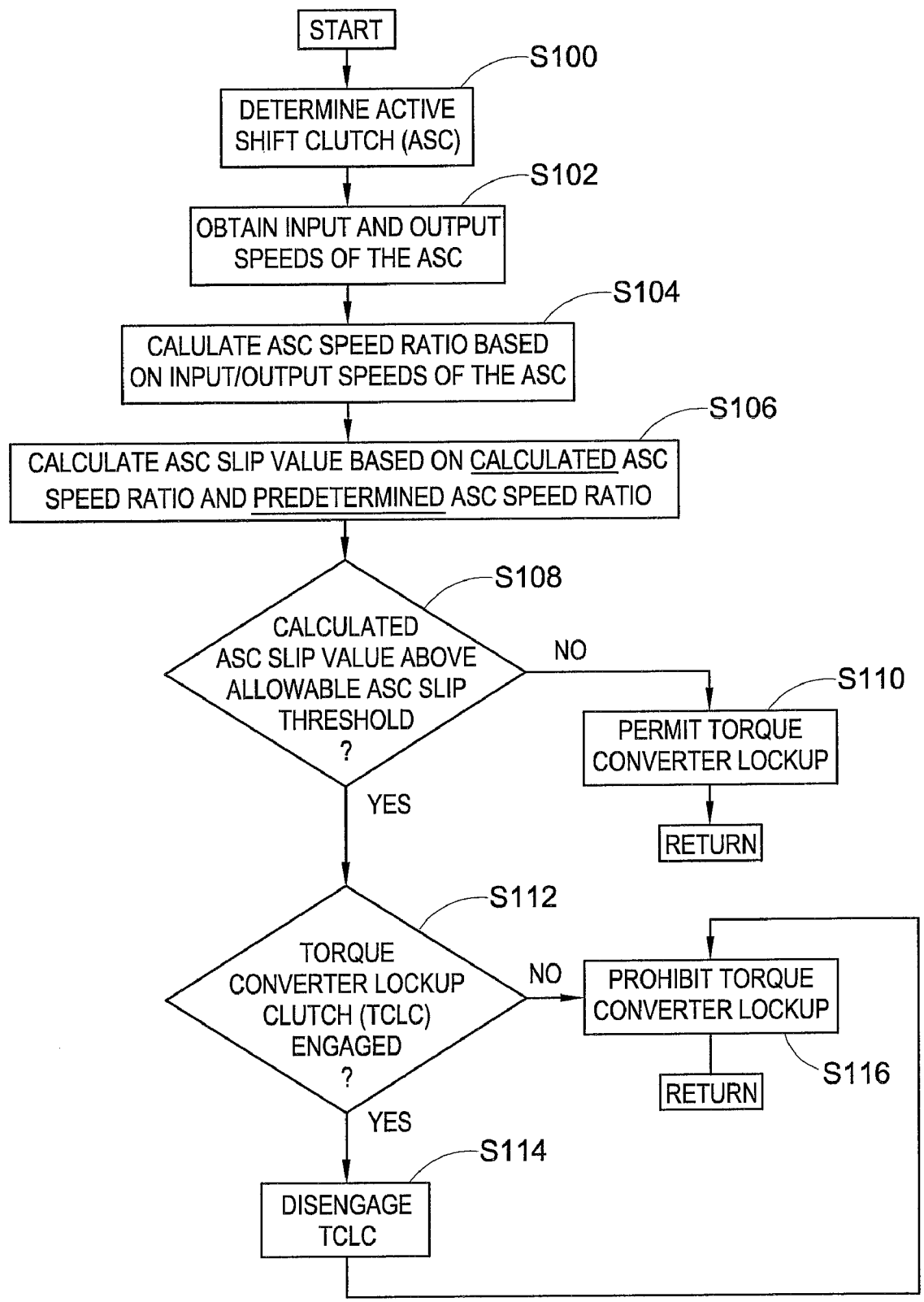
FIG. 4 is a block diagram illustrating a torque converter lockup clutch control method for permitting or prohibiting lockup clutch engagement based on shift clutch slip.

Now with reference to FIG. 4, a method is illustrated for permitting or prohibiting torque converter lockup as a function of shift clutch slip. Generally, the first step (s100) in the method involves determining which of the shift clutches 132*a*, 132*b*, 132*c* is active. In other words, the active shift clutch (ASC) is the shift clutch which is currently engaged or coupling the input shaft 130*a* to the output shaft 130*c* of the transmission 104. The step of determining the ASC (s100) can be accomplished by polling the shift valve control line 139 to determine the position of the shift valve 138 or by directly polling the controller or processing unit responsible for switching the shift valve 138. In addition, the ASC could be determined by a series of calculations based on such inputs as throttle position, vehicle speed, road incline, etc. The next step (s102) of the method includes obtaining the input and output speeds of the ASC. One way of acquiring the input speed of the ASC involves reading a speed signal from a first speed sensor (e.g., sensor 156) located proximal to the input shaft 130*a* (or the driving plates) of the shift clutches. To obtain the output speed of the ASC, a second speed sensor (e.g., sensor 160) can be mounted proximal to the driven plates of the ASC or to a shaft that is positively coupled to the driven plates of the ASC. Afterwards, the signals from the first and second speed sensors can be converted or manipulated in order to render a meaningful and relative speed value. The next step (s104) involves calculating an ASC speed ratio (or gear ratio) based upon the acquired input and output speeds of the ASC. At the same time, a predetermined ASC speed ratio (or gear ratio) is retrieved by an electronic processing unit (e.g. an engine control unit (ECU)), such as EPU 114. Since the gear ratios for all speeds of the transmission are factory set, these values can then be stored in a read only memory (ROM) bank of the EPU 114. When appropriate, the predetermined gear ratio is then recalled from ROM for the gear train corresponding to the ASC.

Next, the method involves calculating an ASC slip value based on the calculated ASC speed ratio and the predetermined ASC speed ratio (s106). Ideally, the calculated ASC speed ratio and the predetermined ASC speed ratio would always be identical. If a discrepancy exists then this implies that a shift clutch is slipping or that one of the gears in the associated gear train is defective. Of course, some slip or inaccuracy in the calculated ASC speed ratio will almost always be present and this unavoidable slip or inaccuracy would generally define a lower limit of an allowable ASC slip threshold. If the ASC slip value does not exceed the allowable ASC slip threshold (s108), then the electronic processing unit, such as EPU 114, will permit the torque converter lockup clutch 124 to be engaged under the typical operating conditions of the transmission 104 (s110). If, however, the ASC slip value is above an allowable ASC slip threshold (s108), then the electronic processing unit 114 determines if the torque converter lockup clutch 124 is engaged and may do so by monitoring the torque converter lockup clutch control line 148. If the torque converter lockup clutch (TCLC) is engaged (s112), then the electronic processing unit 114 will disengage the TCLC (s114) and thereafter prohibit torque converter lockup (s116). On the other hand, if the TCLC is not engaged (s112), then the electronic processing unit directly prohibits torque converter lockup (s116). In this manner, the method continuously operates in a loop type fashion permitting or prohibiting/disengaging torque converter lockup based primarily on if an ASC slip value has exceeded an allowable ASC slip threshold.

Figure 5:
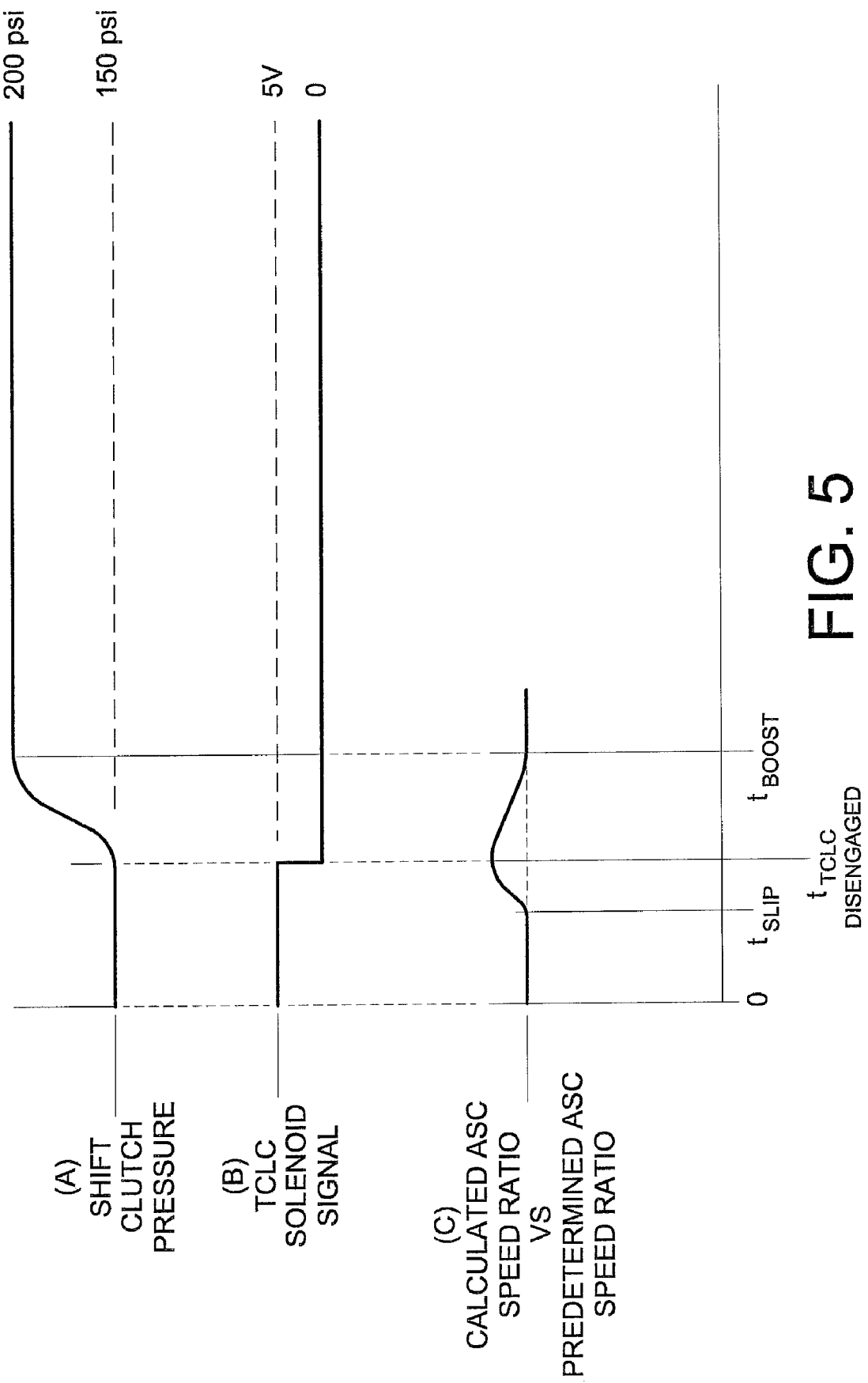
FIG. 5 is a timing chart illustrating a torque converter lockup clutch solenoid signal and shift clutch pressure in response to a slipping shift clutch.

With reference to FIG. 5, a timing chart having three independent graphs illustrates one example of the method set forth above. A first graph (A) depicts shift clutch pressure present at the ASC, a second graph (B) depicts the state of the TCLC based on solenoid signal line voltage, and a third graph (C) depicts the relationship of calculated ASC speed ratio to the predetermined ASC speed ratio. The x axis generally represents time beginning at t=0. At t=0, it is assumed that the transmission is in a steady state, with the vehicle traveling at a steady speed, the torque converter lockup clutch (TCLC) engaged, and the ASC not slipping. With reference to graph (C) at $t_{SLIP}$, calculated ASC speed ratio values begin to depart from the linear predetermined speed ratio values. This is most likely an indication that the ASC has started to slip. The departure between calculated and predetermined ASC speed ratio continues to grow until a maximum is reached at $t_{TCLC\ DISENGAGED}$. At this point, the allowable ASC slip value has been exceeded and the electronic processing unit has disengaged the torque converter lockup clutch. Graph (B) illustrates that the TCLC solenoid control signal goes from a level of 5 volts just prior to $t_{TCLC\ DISENGAGED}$ to 0 volts or DC ground at a point just after $t_{TCLC\ DISENGAGED}$. This indicates that the electronic processing unit has switched off the valve or solenoid responsible for directing the hydraulic pressure and activating the torque converter lockup clutch into the engaged state.

As shown in graph (A) of FIG. 5, when the TCLC is disengaged, a rise in ASC pressure occurs since the impeller and turbine are now rotating at a larger differential speed (i.e. higher fluid slip) and generating a reaction torque at the stator and the stator reaction arm. As discussed previously, this causes the pressure regulator to boost the ASC pressure from a nominal 150 psi (10.3 bar) to a higher level of approximately 200 psi (13.8 bar). Referring once again to graph (C) and consistent with this rise in ASC pressure, the calculated ASC speed ratio gradually begins to return to the linear predetermined ASC speed ratio. This indicates that ASC slip is gradually reduced until eliminated because of the increase in ASC pressure.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A torque converter lockup clutch system for an associated automatic transmission, comprising:
    a torque converter including an impeller operatively coupled to an associated internal combustion engine and a turbine operatively coupled to an input shaft of the associated automatic transmission;
    a lockup clutch disposed within the torque converter for selectively locking the impeller to the turbine, the lockup clutch having an engaged state and a disengaged state;
    a pressure regulator operatively coupled to the torque converter for adjusting the pressure of a working fluid to at least one shift clutch of the associated automatic transmission in response to a speed differential between the impeller and the turbine of the torque converter;
    a shift clutch slip detector for detecting a slip condition of the at least one shift clutch of the associated automatic transmission, the slip detector outputting a slip value; and
    a processing component receiving the slip value and prohibiting the lockup clutch from entering into the engaged state, when the slip value exceeds a predetermined shift clutch slip threshold.

2. The torque converter lockup clutch system of claim 1 further including a stator disposed in the working fluid pathway between the impeller and the turbine, the stator producing a reaction torque in response to the speed differential between the impeller and the turbine, the stator being operatively coupled to the pressure regulator.

3. The torque converter lockup clutch system of claim 2 wherein the stator includes a stator reaction arm for transmitting the reaction torque to the pressure regulator.

4. The torque converter lockup clutch system of claim 1 wherein the processing component disengages the lockup clutch if the lockup clutch is already in the engaged state when the slip value exceeds a predetermined shift clutch slip threshold.

5. The torque converter lockup clutch system of claim 1 wherein the lockup clutch is hydraulically driven between the engaged state and a disengaged state by activating or deactivating a lockup clutch solenoid valve.

6. The torque converter lockup clutch system of claim 1 wherein the processing component is an engine control unit (ECU).

7. The torque converter lockup clutch system of claim 1 wherein the processing component is a transmission control unit (TCU).

8. The torque converter lockup clutch system of claim 1 wherein the slip detector includes a first speed sensor proximal to an input of the at least one shift clutch and a second speed sensor proximal to an output of the at least one shift clutch.

9. The torque converter lockup clutch system of claim 1 wherein the pressure regulator increases the pressure of the working fluid to the at least one shift clutch by at least about fifty percent (50%).

10. A method for controlling a torque converter lockup clutch for eliminating or reducing shift clutch slip in an automatic transmission, the method comprising the steps of:
   determining if at least one shift clutch of the automatic transmission is slipping and outputting a corresponding slip value;
   disengaging the torque converter lockup clutch if the lockup clutch is in an engaged state and the slip value exceeds a permitted shift clutch slip threshold;
   increasing a differential speed between an input portion and an output portion of the torque converter; and
   generating a boost in hydraulic shift clutch pressure, via the increase in differential speed within the torque converter, for reducing slip in the at least one shift clutch.

11. The method according to claim 10, wherein the step of determining further includes reading a first speed corresponding to an input of the at least one shift clutch, reading a second speed corresponding to an output of the at least one shift clutch, and comparing a ratio of the first speed and the second speed to a predetermined speed ratio in order to output the corresponding slip value.

12. The method according to claim 10, wherein the step of determining is performed by an engine control unit (ECU).

13. The method according to claim 10, further including the step of prohibiting the torque converter lockup clutch from engaging or coupling the input portion to the output portion of the torque converter if the lockup clutch is in a disengaged state and the slip value exceeds the permitted shift clutch slip threshold.

14. The method according to claim 10, wherein the step of generating a boost in hydraulic shift clutch pressure further includes transmitting a reaction torque, due to the differential speed within the torque converter, to an adjustable shift clutch fluid pressure regulator.

15. The method according to claim 14, wherein the step of transmitting the reaction torque to the adjustable hydraulic pressure regulator occurs via a stator reaction arm.

16. The method according to claim 10, wherein the step of generating a boost in hydraulic shift clutch pressure includes raising a nominal hydraulic shift clutch pressure by at least about fifty percent (50%).

17. A torque converter lockup clutch system for an associated automatic transmission, comprising:
   a torque converter including an impeller operatively coupled to an associated internal combustion engine, a turbine operatively coupled to an input shaft of the associated automatic transmission, and a stator disposed in a working fluid pathway between the impeller and the turbine;
   a lockup clutch disposed within the torque converter for selectively locking the impeller to the turbine, the lockup clutch having an engaged state and a disengaged state;
   a reaction arm attached to the stator of the torque converter for transmitting a reaction torque developed by the working fluid of the torque converter;
   a pressure regulator operatively coupled to the reaction arm for adjusting the pressure of the working fluid to an at least one shift clutch of the associated automatic transmission;
   a shift clutch slip detector for detecting a slip condition of the at least one shift clutch, the slip detector outputting a slip signal; and
   an engine control unit (ECU) receiving the slip signal and prohibiting the lockup clutch from entering into the engaged state, when the slip signal exceeds a predetermined shift clutch slip threshold.

18. The torque converter lockup clutch system of claim 17 wherein the ECU further includes a means for disengaging the lockup clutch if the lockup clutch is already in the engaged state when the slip value exceeds a predetermined shift clutch slip threshold.

19. The torque converter lockup clutch system of claim 17 wherein the slip detector includes a first speed sensor operatively coupled to an input of the at least one shift clutch and a second speed sensor operatively coupled to an output of the at least one shift clutch.

20. The torque converter lockup clutch system of claim 17 wherein the pressure regulator increases the pressure of the working fluid to the at least one shift clutch by substantially 50%.

21. A torque converter lockup clutch control system for a vehicle, comprising:
   a torque converter having an impeller operatively coupled to an associated internal combustion engine, a turbine operatively coupled to an associated automatic transmission and a lockup clutch selectively locking the impeller and turbine together; and
   a processing component that prohibits said lockup clutch from locking the impeller and turbine together when determined that a shift clutch in the associated automatic transmission is slipping.

22. A toque converter lockup clutch control system of claim 21 further including a pressure regulator fluidly connected to said shift clutch and delivering a boost pressure to said shift clutch when determined that said shift clutch is slipping.

* * * * *